US006846355B2

(12) United States Patent
Hokkirigawa et al.

(10) Patent No.: US 6,846,355 B2
(45) Date of Patent: Jan. 25, 2005

(54) ROAD PAVING MATERIAL AND METHOD

(75) Inventors: Kazuo Hokkirigawa, Sendai (JP); Noriyuki Yoshimura, Miyota-Machi (JP); Jun Hirose, Miyota-Machi (JP)

(73) Assignee: Minebea Co., Ltd. (JP)

( * ) Notice: Subject to any disclaimer, the term of this patent is extended or adjusted under 35 U.S.C. 154(b) by 0 days.

(21) Appl. No.: 10/464,131

(22) Filed: Jun. 18, 2003

(65) Prior Publication Data

US 2004/0221769 A1 Nov. 11, 2004

(30) Foreign Application Priority Data

Jun. 19, 2002 (JP) ....................................... 2002-178985

(51) Int. Cl.[7] .............................................. C09D 195/00

(52) U.S. Cl. ............. 106/282; 106/284.01; 106/284.05; 427/138

(58) Field of Search ............................ 106/282, 284.01, 106/284.05; 427/138

(56) References Cited

U.S. PATENT DOCUMENTS

| | | | |
|---|---|---|---|
| 4,115,283 | A | 9/1978 | Needham |
| 4,196,013 | A | 4/1980 | Dannenberg et al. |
| 4,466,932 | A | 8/1984 | Koyama et al. |
| 4,699,573 | A | 10/1987 | Petrie et al. |
| 5,236,784 | A | 8/1993 | Kobayashi et al. |
| 5,346,737 | A | 9/1994 | Takahashi et al. |
| 5,360,633 | A | 11/1994 | Dean |
| 5,432,213 | A | 7/1995 | Kim et al. |
| 5,549,394 | A | 8/1996 | Nowak et al. |
| 5,641,275 | A | 6/1997 | Klein et al. |
| 5,697,709 | A | 12/1997 | Mori et al. |
| 5,730,916 | A | 3/1998 | Künzel et al. |
| 5,762,699 | A | 6/1998 | McGovern |
| 5,879,791 | A | 3/1999 | Kato et al. |
| 5,916,499 | A | 6/1999 | Murayama et al. |
| 6,033,118 | A | 3/2000 | Asai et al. |
| 6,095,770 | A | 8/2000 | Obata et al. |
| 6,109,887 | A | 8/2000 | Takura et al. |
| 6,193,793 | B1 | 2/2001 | Long et al. |
| 6,342,088 | B1 | 1/2002 | Klatt et al. |
| 6,395,677 | B1 | 5/2002 | Hokkirigawa et al. |
| 6,448,307 | B1 | 9/2002 | Medoff et al. |
| 6,472,042 | B1 | 10/2002 | Dibbern et al. |
| 6,494,928 | B1 | 12/2002 | Hokkirigawa et al. |
| 2002/0111388 | A1 | 8/2002 | Hokkirigawa et al. |
| 2002/0114548 | A1 | 8/2002 | Hokkirigawa et al. |
| 2002/0114549 | A1 | 8/2002 | Hokkirigawa et al. |
| 2002/0152644 | A1 | 10/2002 | Hokkirigawa et al. |
| 2002/0152694 | A1 | 10/2002 | Hokkirigawa et al. |
| 2002/0152697 | A1 | 10/2002 | Hokkirigawa et al. |
| 2002/0174605 | A1 | 11/2002 | Hokkirigawa et al. |
| 2002/0174771 | A1 | 11/2002 | Hokkirigawa et al. |

FOREIGN PATENT DOCUMENTS

| | | | |
|---|---|---|---|
| DE | 23 45 460 | | 3/1975 |
| DE | 23 45 460 | A1 | 3/1975 |
| EP | 001231191 | A1 * | 8/2002 |
| EP | 1 344 791 | A1 | 9/2003 |
| EP | 001375596 | A1 * | 1/2004 |
| JP | 05-032797 | | 2/1993 |
| JP | 07-268126 | | 10/1995 |
| JP | 10095647 | | 4/1998 |
| JP | 11021407 | | 1/1999 |
| JP | 2002284553 | | 10/2002 |
| SU | 1835412 | A1 | 8/1993 |

OTHER PUBLICATIONS

Kazuo Hokkirigawa, Kino Zairyo "Functional Materials", vol. No. 5, pp. 24–28, (May 1997).

Official Publication of Toku Kai Hei 5–32797.

Official Publication of Toku Kai Hei 7–268126.

Database WPI Section Ch, Week 199510, Derwent Publications Ltd., London, GB; AN 1995–073867, XP002247952 & SU 1 835 412 A (Dnepr Chem Techn Inst), (Aug. 23, 1993.).

Kazuo Hokkirigawa, "Development of Hard Porous Carbon Materials "RB Ceramics" by Using Rice Bran," vol. 17, No. 5, pp. 24–28 (May 1997).

Kazuo Hokkirigawa, Material Report R&D, "Development of Hard Porous Carbon Materials "RB Ceramics" by Using Rice Bran as Material," *Kino Zairvo* (Functional Materials), vol. 17, No. 5, pp. 24–28 (May 1997).

* cited by examiner

*Primary Examiner*—David Brunsman
(74) *Attorney, Agent, or Firm*—Ostrolenk, Faber, Gerb & Soffen, LLP

(57) ABSTRACT

A road paving material includes an aggregate, asphalt, and fine ceramic particles selected from the group consisting of RBC particles, CRBC particles, and mixtures thereof.

28 Claims, No Drawings

ROAD PAVING MATERIAL AND METHOD

BACKGROUND OF THE INVENTION

1. Field of the Invention

The present invention relates to a road paving material. More particularly, the present invention relates to an asphalt based road paving material having improved water permeability and sound absorption.

2. Description of the Related Art

Past paving materials used on sidewalks, vehicle roads, and park walkways, for example, have been made of tile, concrete, asphalt, and the like. These materials are not water permeable. As a result, most of the rain water falling on them is not absorbed into the ground, but runs directly into the sewer system. This creates problems such as a shortage of underground water, lower ground levels, reduced tree and shrub growth, and the like.

To remedy these problems, attempts have been made to increase the water permeability of the paving materials by mixing with the asphalt an aggregate of comparatively large stones and the like having grain diameters in the range from about 2 millimeters to about 12 millimeters. The aggregate creates large numbers of continuous pores within the asphalt to pass water. See, e.g., Official Publication of Toku Kai Sho 57-140401.

With these water-permeable paving materials, however, it has been found that with the passage of time, the aggregate tends to become scattered or the pores become clogged by dust, thereby decreasing water permeability.

It has also been found that with time, the plasticizing substance, e.g., the oil portion of the asphalt, evaporates and hardens, which lowers the asphalt's so-called "cushion effect" and lowers the aggregate's binding force. This, in turn, makes the asphalt less stable for vehicles to travel on and less comfortable to walk on. The asphalt is thus susceptible to changes in temperature, e.g., the alternating heat and cold of the seasons causes cracking. Moreover, during the winter this causes pot holes, and leads to a significant increase in wear due to vehicles equipped with snow tires, spike tires, and tire chains. And during the summer, the paved roads tend to become fluidized or softened by high temperatures, thereby creating cracks, stickiness, and the like.

SUMMARY OF THE INVENTION

The present invention relates to a road paving material having improved water permeability and sound absorption properties.

In an embodiment of the present invention, the road paving material comprises aggregate, asphalt, and fine particles of RB ceramics ("RBC"), CRB ceramics ("CRBC"), or combinations of the two ceramics.

In an alternative embodiment of the present invention, a method for improving the sound absorption and water permeability of asphalt paved surfaces includes adding to the asphalt, aggregate, and fine ceramic particles selected from the group consisting of fine RBC particles, fine CRBC particles, and mixtures thereof Other features and advantages of the present invention will become apparent from the following description of the preferred embodiments.

DESCRIPTION OF THE EMBODIMENTS

In an embodiment of the present invention, a road paving material is prepared by adding RBC and/or CRBC particles to a conventional asphalt composition or as part of an aggregate. For purposes of this invention, RBC particles and CRBC particles can be used interchangeably or can be used together. Preferably, the RBC or CRBC particles are fine particles.

RBC particles and CRBC particles, particularly fine particles, are porous carbon materials that not only absorb sound, but also are water permeable. As a result, it has been found that paving materials having improved sound absorption and water permeability can be obtained by mixing RBC particles or CRBC particles, e.g., a powder, or mixtures of the two, with the asphalt.

RBC and CRBC are advantageous because they possess the following qualities.

1. they are very hard;
2. when they are made into grains, their shape is irregular;
3. their expansion coefficient is extremely small;
4. they are electrically conductive;
5. they have high wear resistance;
6. they are porous, water absorptive and gas adsorptive;
7. they are easy to mold;
8. their specific gravity is low, and are light and porous;
9. their friction coefficient is extremely small; and
10. their resistance to friction is superior.

Moreover, because the materials are based on rice bran, there is no adverse effect upon the earth's environment and thus preserve natural resources.

To produce RBC or CRBC, rice bran is preferably used as a starting material because of its low cost. Rice bran is discharged as a by-product of other processes in an amount of 900,000 tons per year in Japan alone and 33,000,000 tons per year throughout the world.

RBC is a carbon material made, for example, by mixing and kneading a de-fatted bran, preferably obtained from rice bran (de-fatted rice bran), with a thermally cured or thermosetting resin, molding the mixture under pressure, drying the molded product, and then firing the dried product in an inert gas atmosphere, e.g., sintering. See, Kazuo Hokkirigawa, Kino Zairyo (Functional Materials), Vol. 17, No. 5, pp. 24–28 (May 1997).

In an embodiment of the invention, the thermosetting resin that is mixed with the de-fatted rice bran can be any resin that is cured by heating or is heat hardened. Preferred resins include, but are not limited to, phenolics, diaryl phthalate resins, unsaturated polyester resins, epoxies, polyimides, triazine resins and the like. Phenolic resins, particularly resols, are especially preferred. One or more thermoplastic resins, such as polyamides and the like, can also be included.

In an embodiment of the invention, the mixing ratio of the de-fatted bran to the thermosetting resin should be about 50 to 90:50 to 10 (50:50 to about 90:10), by weight. A range of about 70 to 80:30 to 20 (70:30 to about 80:20) is preferred. A ratio of about 75:25 is more preferred.

Once mixed, the de-fatted bran and the resins are molded under pressure, pulverized (crushed) and then fired in a rotary kiln, e.g., sintered. Preferably, the firing temperature is in the range of about 700 to 1000° C. The firing time is in the range of about 40 to 140 minutes.

When preparing RBC, the contraction ratio between the dimensions of a molded product formed under pressure and the dimensions of a finished molded product that has been fired in an inert gas atmosphere can vary by as much as 25%. As a result, it is difficult to prepare an accurately molded product.

CRBC has been developed to reduce or remedy this problem. CRBC is a carbon material that is an improvement over RBC. It is a black, porous resin. The contraction ratio of CRBC is extremely small, i.e., less than 3%.

To prepare CRBC, for example, de-fatted bran (again preferably obtained from rice bran) and a thermosetting resin are mixed and kneaded, and then first fired in a rotary kiln in an inert gas atmosphere at a temperature in the range of about 700° to 1000° C., e.g., sintered. Preferably, the thermosetting resin is a low molecular weight liquid resin. The firing time is about 40 to 120 minutes.

The resulting material is then pulverized to less than 100 mesh to obtain carbonized powder. The powder is then mixed and kneaded with a thermosetting resin, and molded under pressure in the range of about 20 Mpa to 30 Mpa, preferably about 21 to 25 Mpa. The mixing ratio between the carbonized powder and the thermosetting resin is in the range of about 50:50 to about 90:10 by weight; however, a range of from about 70:30 to about 80:20 is preferred.

The molded product is again heat-treated in an inert gas atmosphere at a temperature in the range of about 300° to 1100° C., e.g., sintered. Preferably, the temperature of the metal mold is about 150° C. or higher. The inert gas used for the heat treatments can be helium, argon, neon, nitrogen or the like. Nitrogen is preferred.

For the second heat treatment, a satisfactorily controlled electric furnace is ordinarily used. The heat treatment time for the molded product is about 60 to 360 minutes. During heat treatment, the temperature of the furnace should be raised comparatively slowly up to 500° C. Preferably, the temperature should be raised at a rate of about 0.5° to about 3° C. per minute and, more preferably, about 1° C. per minute.

In an embodiment of the invention, after the heat treatment, the temperature of the furnace is lowered comparatively slowly until a temperature of about 500° C. is reached. Below 500° C., the mixture can be left to cool down naturally. Preferably, the furnace is cooled down to 500° C. at a rate of about 0.5° C. to about 4° C. per minute. More preferably, it is carried out at a rate of about 1° C. per minute.

Preferably, the RBC or CRBC is dried after molding at a temperature above 100° C.

An embodiment of the present invention relates to a road paving material that includes A) an aggregate, B) asphalt, and C) fine RBC particles and/or CRBC particles, e.g., powder. When the RBC or CRBC is used in fine particle form, both can be used individually in the same manner, or can be used together.

In an embodiment of the invention, the aggregate constitutes from about 90 to about 96 weight percent of the road paving material; the asphalt constitutes from about 3.7 to about 7 weight percent; and the fine RBC or CRBC particles constitute from about 0.3 to about 3 weight percent.

In an embodiment of the invention, the mean particle size or diameter of the RBC or CRBC should be in the range of from about 100 μm to about 2 millimeters. It has been found that mixing the RBC fine particles or CRBC fine particles into the asphalt improves the water permeability of the road paving material, improves the flow resistence of the material, and makes the material harder. To further improve the road paving material's water permeability, one or more organic fibers, such as polyester fibers, polypropylene fibers, polyarnide fibers, vinylon fibers, Alamide fibers and cellulose fibers or the like, or one or more inorganic fibers, such as carbon fibers, glass fibers, or rock wool or the like can be added.

In an embodiment of the invention, the organic fibers should have an average diameter in the range of from about 5 μm to about 15 μm, and an average length in the range of from about 0.5 millimeters to about 6 millimeters. Where inorganic fibers are used, the average diameter should be in the range of from about 1 μm to about 5 μm and the average length should also be in the range of from about 0.5 millimeter to about 6 millimeters.

In an embodiment of the invention, the organic fibers and/or inorganic fibers should constitute about 5 to about 20 percent by weight of the asphalt composition.

In an embodiment of the invention, natural stones, pulverized stones, granular slag, granular ceramics, and the like can be used as the aggregate. Preferably, the mean particle size of the aggregate should be about 2 to about 12 millimeters. If the particle size is more than 12 millimeters, there will be less binding among the aggregates, thereby bringing about a decline in strength. On the other hand, if the particle size is less than 2 millimeters, there will be more binding points and therefore greater strength. Water permeability, however, will be reduced.

Any of the known asphalts can be used in the road paving material of the present invention. Preferably, the asphalt that can be used include, but are not limited to, straight asphalt, blown asphalt, natural asphalt, and the like and mixtures thereof.

In an embodiment of the invention, the penetration value of the asphalt should be about 20 to about 140 and, more preferably, from about 40 to about 120. If the penetration value is less than 20, the asphalt tends to become too hard and fragile, thereby making it unsuitable as a paving material. If it is more than 140, the asphalt becomes too soft, bringing about undesirable characteristics, such as wear and deformation. The penetration value is derived by performing a standard asphalt penetration test known by those skilled in the art. The penetration value is expressed as a distance (in tenths of a millimeter) that a standard needle penetrates an asphalt sample under a 100 g load, at a temperature of 25° C. for 5 seconds.

In an embodiment of the invention, part of the aggregate can be replaced by RBC and/or CRBC aggregate. Preferably, the RBC and/or CRBC aggregate can be formed from a molded RBC and/or CRBC product or a crushed or pulverized RBC and/or CRBC product. The mixing ratio of the molded product of RBC and/or CRBC or the crushed RBC and/or CRBC is preferably from about 1 to about 20 percent by weight of the aggregate. This further improves water permeability, more effectively absorbs tire sounds and can produce an electro-static discharge effect.

In an embodiment of the invention, the mean particle size of the RBC and/or CRBC molded product that is used as part of the aggregate should be about 2 to about 12 millimeters. Alternatively, the RBC and/or CRBC can be prepared as a molded product of approximately 20 to 100 millimeters and then pulverized into lumps whose size is approximately in the range of about 2 to 12 millimeters.

The shape of the molded RBC and/or CRBC aggregate can, for example, be globular, spherical, starry, cubic, rectangular, cylindrical, prismic, or tetra-pot or the like. The molded RBC and/or CRBC aggregate can be molded by any of the known methods, such as by molding into shape by a mold or casting cavity.

In an embodiment of the present invention, it has been found that various kinds of resin mixtures can be employed. By using various kinds of resin mixtures, it becomes possible to form ceramics having various features. For example, the ratio of the mixture of RBC/CRBC can be modified where the paving material, for example, needs to be electrically conductive to remove static electricity. Another example is to modify the ratio of the mixture of RBC/CRBC when the paving material needs to transmit an electric signal. In such an application, the road paving material of the present invention can act as a sensor or can be used as a wireless conductor in a wide variety of applications.

In an embodiment of the present invention, the road paving material can be used with other components if added properties are desired. For example, any of the known elastomers can be used as reinforcing materials, such as styrene/butadiene/styrene block copolymers (SBS), styrene/isoprene/styrene copolymers (SIS), or styrene/ethylene/butylene/styrene copolymers (SEBS), and the like. Additives, such as carbon black, silica particles, and the like can be added to the road paving material of the present invention to increase water permeability, for example. Aging prevention agents, oil and petroleum resins and the like can also be added to the road paving material of the present invention.

The advantages and the important features of the present invention will be more apparent from the following examples.

Preparafion of Fine RBC and CRBC Particles

PREPARATION EXAMPLE 1

Fine RBC Particles

De-fatted bran obtained from rice bran (75 kilograms) and a liquid phenolic resin (resol) (25 kilograms) were mixed and kneaded while being heated to the range of 50–60° C. A plastic mixture of uniform quality was obtained.

The mixture was fired in a rotary kiln at a temperature of 900° C. for a period of 130 minutes under a nitrogen atmosphere. The resulting carbonized product was sifted through a 50-mesh sieve yielding fine RBC particles whose particle size was in the range of 300 to 500 m.

PREPARATION EXAMPLE 2

Fine RBC Particles

De-fatted bran obtained from rice bran (80 kilograms) and a liquid phenolic resin (resol) (20 kilograms) were mixed and kneaded while being heated in the range of 50–60° C. A plastic mixture of uniform quality was obtained.

The mixture was fired in a rotary kiln at a temperature of 1000° C. for a period of 130 minutes under a nitrogen atmosphere. The resulting carbonized product was sifted through a 50-mesh sieve yielding fine RBC particles whose particle size was in the range of 300 to 500 μm.

PREPARATION EXAMPLE 3

Fine CRBC Particles

De-fatted bran obtained from rice bran (75 kilograms) and a liquid phenolic resin (resol) (25 kilograms) were mixed and kneaded while being heated in the range of 50–60° C. A plastic mixture of uniform quality was obtained.

The mixture was first fired in a rotary kiln at a temperature of 90$^{00}$ C. for a period of 120 minutes under a nitrogen atmosphere. The resulting carbonized product was sifted through a 50-mesh sieve yielding carbonized particles whose particle size was in the range of 300 to 500 μm.

A quantity of 75 kilograms of the carbonized powder and 25 kilograms of a solid phenol resin (resol) were mixed and kneaded while being heated in the range of 100–150° C. A plastic mixture of uniform quality was obtained.

Next, the plastic mixture was molded under a pressure of 22 Mpa into a globular shape having a diameter of 3 centimeters. The temperature of the metal mold was 150° C.

The molded product was extracted from the metal mold and the temperature was raised at the rate of 2° C. per minute under a nitrogen atmosphere until 500° C. was reached. The temperature was held at 500° C. for 60 minutes, and again fired at a temperature of 900° C. for a period of 120 minutes.

Next, the temperature was lowered to 500° C. at the rate of 2 to 3° C. per minute, followed by natural cooling below 500° C.

Finally, the product was crushed by a pulverizer and sifted through a 50-mesh sieve to yield a carbonized powder having a mean particle size in the range of 300 to 500 μm.

PREPARATION EXAMPLE 4

Fine CRBC Particles

De-fatted bran obtained from rice bran (75 kilograms) and a liquid phenolic resin (resol) (25 kilograms) were mixed and kneaded while being heated in the range of 50–60° C. A plastic mixture of uniform quality was obtained.

The mixture was first fired in a rotary kiln at a temperature of 900° C. for a period of 120 minutes under a nitrogen atmosphere. The resulting carbonized product was sifted through a 50-mesh sieve to yield a carbonized powder whose particle size was in the range of 300 to 500 μm.

A quantity of 80 kilograms of the carbonized powder and 25 kilograms of a solid phenol resin (resol) were mixed and kneaded while being heated in the range of 100–150° C. A plastic mixture of uniform quality was obtained.

Next, the plastic mixture was molded under a pressure of 22 Mpa into a globular shape having a diameter of 3 centimeters. The temperature of the metal mold was 150° C.

The molded product was extracted from the metal mold, and the temperature was raised at the rate of 1° C. per minute under a nitrogen atmosphere until 500° C. was reached. The temperature was held at 500° C. for 60 minutes, and again fired at a temperature of 800° C. for a period of about 120 minutes.

Next, the temperature was lowered to 500° C. at the rate of 2 to 3° C. per minute, followed by natural cooling below 500° C.

Finally, the product was crushed and sifted through a 100-mesh sieve to yield a carbonized powder whose particle size was in the range of 200 to 250 μm.

Preparation of RB and CRB Ceramic Aggregate

PREPARATION EXAMPLE 5

RB Ceramic Aggeregate

De-fatted bran obtained from rice bran (75 kilograms) and a liquid phenolic resin (resol) (25 kilograms) were mixed and kneaded while being heated in the range of 50–60° C. A plastic mixture of uniform quality was obtained.

The mixture was formed under a pressure of 22 Mpa into a globular shape having a diameter of 10 millimeters. The temperature was raised to 500° C. at a rate of 1.5° C. per minute in an electric furnace under a nitrogen atmosphere. It was held at 500° C. for 60 minutes and fired at a temperature of 850° C. for a period of 130 minutes.

Next, the temperature was lowered to 500° C. at the cooling rate of 2 to 3° C. per minute. At a temperature of 500° C., the product was left to cool naturally. An RBC aggregate about 9 millimeters in diameter was obtained.

PREPARATION EXAMPLE 6

RBC Aggregate

De-fatted bran obtained from rice bran (80 kilograms) and a liquid phenolic resin (resol) (20 kilograms) were mixed and kneaded while being heated in the range of 50–60° C. A plastic mixture of uniform quality was obtained.

The plastic mixture was molded under a pressure of 22 Mpa into a tetragonal shape having a side dimension of 10 millimeters. The temperature was raised to 500° C. at the rate of 1.5° C. per minute in an electric furnace under a nitrogen atrnosphere. It was held at 500° C. for 60 minutes, and fired at a temperature of 800° C. for a period of 140 minutes.

Next, the temperature was lowered to 500° C. at a cooling rate of 2 to 3° C. per minute. At a temperature of 500° C., the product was left to cool naturally.

A tetragonal shaped RBC aggregate with a side dimension of approximately 9 millimeters was obtained.

PREPARATION EXAMPLE 7

CRBC Aggregate

De-fatted bran obtained from rice bran (75 kilograms) and a liquid phenolic resin (resol) (25 kilograms) were mixed and kneaded while being heated in the range of 50–60° C. A plastic mixture of uniform quality was obtained.

The mixture was first fired in a rotary kiln at 900° C. for 120 minutes under a nitrogen atmosphere. The resulting carbonized fired product was sifted through a 100-mesh sieve to yield a carbonized powder whose particle size was in the range of 200–250 μm.

A quantity of 75 kilograms of the carbonized powder and 25 kilograms of a phenolic resin (resol) were mixed and kneaded while being heated in the range of 100–150° C. A plastic mixture of uniform quality was obtained.

Next, the plastic mixture was molded under a pressure of 22 Mpa into a globular shape having a diameter of 10 millimeters. The temperature of the metal mold was 150° C.

The molded product was extracted from the metal mold, and the temperature was elevated at a rate of 1° C. per minute until 500° C. was reached, where it was held for a period of 60 minutes. The product was again fired at 800° C. for approximately 120 minutes.

Next, the temperature was lowered at a rate of 2 to 3° C. per minute until 500° C. was reached, and then naturally cooled.

As a result, globular shaped CRBC aggregates with an average diameter of 10 millimeters were obtained.

PREPARATION EXAMPLE 8

CRBC Aggregate

De-fatted bran obtained from rice bran (75 kilograms) and a phenolic resin (resol) (25 kilograms) were mixed and kneaded while being heated in the range of 50–60° C. A plastic mixture of uniform quality was obtained.

The mixture was first fired in a rotary kiln at 900° C. for 120 minutes under a nitrogen atmosphere. The carbonized fired product obtained was sifted through a 50-mesh sieve to yield a carbonized powder whose particle size was in the range of 300–500 μm.

A quantity of 80 kilograms of the carbonized powder and 25 kilograms of a phenolic resin (resol) were mixed and kneaded while being heated in the range of 100–150° C. A plastic mixture of uniform quality was obtained.

Next, the plastic mixture was molded under a pressure of 22 Mpa into a square shape having a side dimension of 10 millimeters. The temperature of the metal mold was 150° C.

The molded product was extracted from the metal mold, and the temperature was raised at a rate of 1° C. per minute until 500° C. was reached, where it was held for a period of 60 minutes. The product was again fired at 750° C. for approximately 120 minutes.

Next, the temperature was lowered at a rate of 2 to 3° C. per minute until 500° C. was reached, and then naturally cooled.

As a result, square shaped CRBC aggregates with an average side dimension of 10 millimeters were obtained.

Preparation of Asphalt Composition

EXAMPLE 1

A quantity of 300 kilograms of aggregate and 3 kilograms of the RBC particles of Preparation Example 1 were put into a batch-type mixing mill for asphalt paving materials and heated to 160° C.

The mean particle size distribution of the aggregate was:

Less than 2 millimeters: 8 weight percent 2 to 4 millimeters: 20 weight percent 4 to 8 millimeters: 22 weight percent 8 to 12 millimeters: 50 weight percent More than 12 millimeters: 0 weight percent A quantity of 18 kilograms of straight asphalt whose penetration value was in the range of 60 to 70 was then added. By carrying out uniform mixing in the mill, an asphalt composition was obtained.

EXAMPLE 2

A quantity of 300 kilograms of the aggregate described in Example 1 and 3 kilograms of the CRBC particles of Preparation Example 3 were placed into a batch mixing mill for asphalt paving materials and heated to 160° C.

A quantity of 16 kilograms of straight asphalt whose penetration value was in the range of 60 to 70 was then added. By uniform mixing in the mill, an asphalt composition was obtained.

EXAMPLE 3

A quantity of 300 kilograms of the aggregate of Example 1, 4 kilograms of the RBC particles of Preparation Example 2, and 0.2 kilograms of glass fibers whose mean diameter was 3 μm and mean length 5 millimeters were placed in a batch mixing mill for asphalt paving materials and heated to 160° C.

A quantity of 18 kilograms of straight asphalt whose penetration value was in the range of 60 to 70 was then added. By uniform mixing in the mill, an asphalt composition was obtained.

EXAMPLE 4

A quantity of 300 kilograms of the aggregate of Example 1, 4 kilograms of the RBC particles of Preparation Example 2, and 0.1 kilograms of polypropylene fibers whose mean diameter was 10 μm and mean length 5 millimeters were placed in a batch mixing mill for asphalt paving materials and heated to 160° C.

A quantity of 18 kilograms of straight asphalt whose penetration value was in the range of 60 to 70 was then added. By carrying out uniform mixing in the mill, an asphalt composition was obtained.

EXAMPLE 5

A quantity of 300 kilograms of the aggregate of Example 1, 8 kilograms of the RBC aggregate of Preparation Example 5, and 4 kilograms of the RBC particles of Preparation Example 2 were placed in a batch mixing mill for asphalt paving materials and heated to 160° C.

A quantity of 18 kilograms of straight asphalt whose penetration value was in the range of 60 to 70 was then added. By carrying out uniform mixing in the mill, an asphalt composition was obtained.

EXAMPLE 6

A quantity of 300 kilograms of the aggregate of Example 1, 8 kilograms of the RBC aggregate of Preparation Example 5, and 4 kilograms of the RBC particles of Preparation Example 2 were placed into a batch mixing mill for asphalt paving materials and heated to 160° C.

A quantity of 18 kilograms of straight asphalt whose penetration value was in the range of 60 to 70 was then added. By carrying out even mixing in the mill, an asphalt composition was obtained.

EXAMPLE 7

A quantity of 300 kilograms of the aggregate of Example 1, 8 kilograms of the RBC aggregate of Preparation Example 5, and 4 kilograms of the RBC particles of Preparation Example 2 were put into a batch mixing mill for asphalt paving materials and heated to 160° C.;

A quantity of 18 kilograms of straight asphalt whose penetration value was in the range of 60 to 70 was then added. By carrying out uniform mixing in the mill, an asphalt composition was obtained.

EXAMPLE 8

A quantity of 300 kilograms of the aggregate of Example 1, 2 kilograms of the RBC particles of Preparation Example 1 and 2 kilograms of the CRBC particles of Preparation Example 3 were put into a batch mixing mill for asphalt paving materials and heated to 160° C.

A quantity of 18 kilograms of straight asphalt whose penetration value was in the range of 60 to 70 was then added. By carrying out even mixing in the mill, an asphalt composition was obtained.

EXAMPLE 9

A quantity of 300 kilograms of the aggregate of Example 1, 8 kilograms of the RBC aggregate of Preparation Example 6, 4 kilograms of the RBC particles of Preparation Example 2, and 0.1 kilogram of polypropylene fibers whose mean diameter was 10 μm and mean length 5 millimeters were placed in a batch mixing mill for asphalt paving materials and heated to 160° C.

Straight asphalt (20 kilograms) with a penetration value in the range of 60 to 70 was then added. By carrying out even mixing in the mill, an asphalt composition was obtained.

EXAMPLE 10

A quantity of 300 kilograms of the aggregate of Example 1, 5 kilograms of the RBC aggregate of Preparation Example 6, 4 kilograms of the CRBC aggregate of Preparation Example 8, 4 kilograms of the RBC particles of Preparation Example 2, and 0.1 kilogram of polypropylene fibers whose mean diameter was 10 μm and mean length 5 millimeters were put into a batch mixing mill for asphalt paving materials and heated to 160° C.

A quantity of 18 kilograms of straight asphalt whose penetration value was in the range of 60 to 70 was then added. By carrying out even mixing in the mill, an asphalt composition was obtained.

EXAMPLE 11

A quantity of 300 kilograms of the aggregate of Example 1, 5 kilograms of the RBC aggregate of Preparation Example 5, 4 kilograms of the CRBC aggregate of Preparation Example 8, 4 kilograms of the RBC particles of Preparation Example 2, and 0.1 kilogram of polypropylene fibers whose mean diameter was 10 μm and mean length 5 millimeters were put into a batch mixing mill for asphalt paving materials and heated to 160° C.

A quantity of 18 kilograms of straight asphalt whose penetration value was in the range of 60 to 70 was then added. By carrying out even mixing in the mill, an asphalt composition was obtained.

EXAMPLE 12

A quantity of 300 kilograms of the aggregate of Example 1, 5 kilograms of the RBC aggregate of Preparation Example 5, 5 kilograms of the RBC aggregate of Preparation Example 6, 2 kilograms of the RBC particles of Preparation Example 1, and 2 kilograms of the CRBC particles of Preparation Example 3 were placed in a batch mixing mill for asphalt paving materials and heated to 160° C.

A quantity of 18 kilograms of straight asphalt whose penetration value was in the range of 60 to 70 was then added. By carrying out uniform mixing in the mill, an asphalt composition was obtained.

EXAMPLE 13

A quantity of 300 kilograms of the aggregate of Example 1, 5 kilograms of the RBC aggregate of Preparation Example 5, 5 kilograms of the CRBC aggregate of Preparation Example 7, 3 kilograms of the RBC particles of Preparation Example 1, and 0.2 kilogram of glass fibers whose mean diameter was 3 μm and mean length 5 millimeters were placed in a batch mixing mill for asphalt paving materials and heated to 160° C.

A quantity of 20 kilograms of straight asphalt whose penetration value was in the range of 60 to 70 was then ad ded. By carrying out even mixing in the mill, an asphalt composition was obtained.

EXAMPLE 14

A quantity of 300 kilograms of the aggregate of Example 1, 5 kilograms of the RBC aggregate of Preparation Example 5, 5 kilograms of the CRBC aggregate of Preparation Example 8, 2 kilograms of the RBC particles of Preparation Example 2, 2 kilograms of the CRBC particles of Preparation Example 4, and 0.3 kilogram of carbon fibers whose mean diameter was 3 μm and mean length 5 millimeters were put into a batch mixing mill for asphalt paving materials and heated to 160° C.

A quantity of 18 kilograms of straight asphalt whose penetration value was in the range of 60 to 70 was then added. By carrying out even mixing in the mill, an asphalt composition was obtained.

EXAMPLE 15

A quantity of 300 kilograms of the aggregate of Example 1, 5 kilograms of the RBC aggregate of Preparation Example 5, 5 kilograms of the RBC aggregate of Preparation Example 6, 2 kilograms of the CRBC particles of Preparation Example 3, 2 kilograms of the RBC particles of Preparation Example 4, and 0.3 kilogram of carbon fibers whose mean diameter was 3 μm and mean length 5 millimeters were placed in a batch mixing mill for asphalt paving materials and heated to 160° C.

A quantity of 22 kilograms of straight asphalt whose penetration value was in the range of 60 to 70 was then added. By carrying out even mixing in the mill, an asphalt composition was obtained.

EXAMPLE 16

A quantity of 300 kilograms of the aggregate of Example 1, 6 kilograms of the CRBC aggregate of Preparation Example 7, 2 kilograms of the RBC particles of Preparation Example 1, 2 kilograms of the RBC particles of Preparation Example 4, and 0.3 kilogram of carbon fibers whose mean diameter was 3 μm and mean length 5 millimeters were put into a batch mixing mill for asphalt paving materials and heated to 160° C.

A quantity of 20 kilograms of straight asphalt whose penetration value was in the range of 60 to 70 was then added. By carrying out even mixing in the mill, an asphalt composition was obtained.

EXAMPLE 17

A quantity of 300 kilograms of the aggregate of Example 1, 5 kilograms of the RBC aggregate of Preparation Example 5, 5 kilograms of the CRBC aggregate of Preparation Example 8, 4 kilograms of the RBC particles of Preparation Example 2, and 0.1 kilogram of polyester fibers whose mean diameter was 10 μm and mean length 5 millimeters were put into a batch mixing mill for asphalt paving materials and heated to 160° C.

A quantity of 20 kilograms of straight asphalt whose penetration value was in the range of 60 to 70 was then added. By carrying out uniform mixing in the mill, an asphalt composition was obtained.

EXAMPLE 18

A quantity of 300 kilograms of the aggregate of Example 1, 4 kilograms of the RBC agregate of Preparation Example 6, 5 kilograms of the CRBC aggregate of Preparation Example 7, 4 kilograms of the RBC particles of Preparation Example 2, and 0.2 kilogram of cellulose fibers whose mean diameter was 10 μm, and mean length 5 millimeters were put in a batch mixing mill for asphalt paving materials and heated to 160° C.

A quantity of 20 kilograms of straight asphalt whose penetration value was in the range of 60 to 70 was then added. By carrying out even mixing in the mill, an asphalt composition was obtained.

COMPARATIVE EXAMPLE 1

A quantity of 300 kilograms of the aggregate of Example 1 was put in a batch mixing mill for asphalt paving materials and heated to 160° C.

A quantity of 18 kilograms of straight asphalt whose penetration value was in the range of 60 to 70 was then added. By carrying out even mixing in the mill, an asphalt composition was obtained.

COMPARATIVE EXAMPLE 2

A quantity of 300 kilograms of the aggregate of Example 1 was put into a batch mixing mill for asphalt paving materials and 0.2 kilogram of glass fibers whose mean diameter was 3 μm and mean length 5 millimeters was added. The mixture was heated to 160° C.

A quantity of 18 kilograms of straight asphalt whose penetration value was in the range of 60 to 70 was then added. By carrying out even mixing in the mill, an asphalt composition was obtained.

The characteristics of the asphalt compositions of Examples 1 through 18 and Comparative Examples 1 and 2 are shown in Table 1.

TABLE 1

Characteristics of Asphalt Compositions

| Example | Water Permeability (minutes) | Sound Absorption (%) | Over-all Evaluation |
|---|---|---|---|
| 1 | 2 | 2 | 2 |
| 2 | 2 | 2 | 2 |
| 3 | 2 | 2 | 2 |
| 4 | 2 | 2 | 2 |
| 5 | 1 | 1 | 1 |
| 6 | 1 | 1 | 1 |
| 7 | 1 | 1 | 1 |
| 8 | 2 | 2 | 2 |
| 9 | 1 | 1 | 1 |
| 10 | 1 | 1 | 1 |
| 11 | 1 | 1 | 1 |
| 12 | 1 | 1 | 1 |
| 13 | 1 | 1 | 1 |
| 14 | 1 | 1 | 1 |
| 15 | 1 | 1 | 1 |
| 16 | 1 | 2 | 1 |
| 17 | 1 | 1 | 1 |
| 18 | 1 | 1 | 1 |
| Comparative 1 | 4 | 4 | 4 |
| Comparative 2 | 3 | 3 | 3 |

Water permeability was determined as follows: the asphalt composition was poured at a temperature of 160° C. in the form of a square-shaped sample, 20 centimeters in length, 20 centimeters in width, and 5 centimeters in thickness. After cooling, the sample plate was places on a blotter, water was dripped onto the plate, and the time required for the blotting paper to be wetted by the water was determined. The values in Table 1 for "Water Permeability" mean:

1: With in 10 minutes;

2: 10 to 20' minutes;

3: 20 to 30 minutes; and

4: More than 30 minutes.

With respect to "Sound Absorption", the vertical incident sound absorption rate was examin ed by using a 400 Hz sound wave. The values in Table 1 for "Sound Absorption" mean:

1: More than 22%;

2: 20 through less than 22%;

3: 18 through less than 20%; and

4: Less than 18%.

The "Over-All Evaluation" score was determined by taking in account the "Water Permeability" value, the "Sound Absorption" value, and the state of the finished surface of each sample as observed by the naked eye. The values in Table 1 for "Over-all Evaluation" mean:

1: Extremely satisfactory;

2: Satisfactory;

3: Ordinary; and

4: Unsatisfactory.

In summary, as shown in Table 1, the road paving material of the present invention shows at least satisfactory water permeability and sound absorption qualities. The road paving material is environmentally benign and capable of effectively utilizing de-fatted bran that has been discarded in the past.

Although the present invention has been described in relation to particular embodiments thereof, many other variations and modifications and other uses will become apparent to those skilled in the art. The present invention therefore is not limited by the specific disclosure herein.

What is claimed is:

1. A road paving composition, comprising:

aggregate, asphalt, and at least one of particles selected from the group consisting of RBC particles and CRBC particles.

2. The road paving composition of claim 1, wherein the composition includes about 90 to about 96 weight percent of the aggregate, about 3.7 to about 7 weight percent of the asphalt, and about 0.3 to about 3 weight percent of the at least one of particles selected from the group consisting of RBC particles and CRBC particles.

3. The road paving composition of claim 1, wherein the mean particle size of the aggregate is about 2 to about 12 millimeters, and the mean particle size of the at least one of RBC particles and CRBC particles is about 100 μm to about 2.0 millimeters.

4. The road paving composition of claim 1, wherein at least part of the aggregate includes at least one of an aggregate selected from the group consisting of RBC aggregate and CRBC aggregate.

5. The road paving composition of claim 4, wherein about 1 to about 20 weight percent of the aggregate includes the at least one of an aggregate selected from the group consisting of an RBC aggregate and CRBC aggregate.

6. The road paving composition of claim 4, wherein the mean particle size of the at least one of an aggregate selected from the group consisting of an RBC aggregate and CRBC aggregate is about 2 to about 12 millimeters.

7. The road paving composition of claim 1, wherein at least part of the aggregate includes at least one of a product selected from the group consisting of:

a) a molded product selected from the group consisting of at least one of a molded RBC, molded RBC and mixtures thereof; and b) a crushed product selected from the group consisting of at least one of a crushed RBC, crushed CRBC, and mixtures thereof.

8. The road paving composition of claim 1, further including at least one of fibers selected from the group consisting of organic fibers and inorganic fibers.

9. The road paving composition of claim 8, wherein the at least one of fibers selected from the group consisting of organic fibers and inorganic fibers are selected from the group consisting of polyester fibers, polypropylene fibers, polyamide fibers, vinylon fibers, alamide fibers, cellulose fibers, carbon fibers, glass fibers, and rock wool.

10. The road paving composition of claim 8, wherein the average length of the at least one of fibers selected from the group consisting of organic fibers or inorganic fibers is about 0.5 millimeters to about 6 millimeters.

11. The road paving composition of claim 8, wherein the average diameter of the organic fibers is about 5 to about 15 μm, and the average diameter of the inorganic fibers is about 1 μm to about 5 μm.

12. The road paving composition of claim 8, wherein about 5 to about 20 weight percent of the asphalt includes the at least one of fibers selected from the group consisting organic and inorganic fibers.

13. The road paving composition of claim 1, wherein the at least one of particles selected from the group consisting of RBC particles and CRBC particles include fine particles.

14. The road paving composition of claim 13, wherein at least part of the at least one of particles selected from the group consisting RBC particles and CRBC particles are in powder form.

15. A road paving composition, comprising:

an aggregate having a mean particle size of about 2 millimeters to about 12 millimeters, the aggregate constituting about 90 to about 96 weight percent of the composition;

an asphalt constituting about 3.7 to about 7 weight percent of the composition; and at least one of RBC particles and CRBC particles, the at least one of RBC particles and CRBC particles having a mean particle size of about 100 μm to about 2 millimeters, and constituting about 0.3 to about 3 weight percent of the composition.

16. A road paving composition, comprising:

an aggregate having a mean particle size of about 2 millimeters to about 12 millimeters, the aggregate constituting about 90 to about 96 weight percent of the composition;

an asphalt constituting about 3.7 to about 7 weight percent of the composition;

at least one of particles selected from the group consisting of fine RBC particles and fine CRBC particles, the at least one of fine particles selected from the group consisting of RBC particles and fine CRBC particles having a mean particle size of about 100 μm to about 2 millimeters, and constituting about 0.3 to about 3 weight percent of the composition; and at least one of aggregate particles selected from the group consisting of RBC aggregate and CRBC aggregate particles, the at least one of aggregate particles selected from the group consisting of RBC aggregate and CRBC aggregate particles having a mean particle size of about 2 millimeters to about 12 millimeters, and constituting about 1 to about 20 weight percent of the aggregate.

17. A road paving composition, comprising:

an aggregate having a mean particle size of about 2 millimeters to about 12 millimeters, the aggregate constituting about 90 to about 96 weight percent of the composition;

an asphalt constituting about 3.7 to about 7 weight percent of the composition;

at least one of particles selected from the group consisting of fine RBC particles and fine CRBC particles, the at least one of fine RBC particles and fuie CRBC particles having a mean particle size of about 100 μm to about 2 millimeters, and constituting about 0.3 to about 3 weight percent of the composition;

at least one of aggregate particles selected from the group consisting of RBC aggregate and CRBC aggregate particles, the at least one aggregate particles selected from the group consisting of RBC aggregate and CRBC aggregate particles having a mean particle size of about 2 millimeters to about 12 millimeters, and constituting about 1 to about 20 weight percent of the aggregate; and at least one of fibers selected from the group consisting of organic fibers and inorganic fibers, the at least one of fibers selected from the group consisting organic fibers and inorganic fibers constituting about 5 to about 20 weight percent of the asphalt.

18. A method of improving the sound absorption and water permeability of an asphalt composition, comprising the step of:

adding at least one of particles selected from the group consisting of RBC particles and CRBC particles to the asphalt composition to form a road paving material.

19. The method of claim 18, further comprising the step of:

adding an aggregate to the composition.

20. The method of claim 19, further comprising the step of:

adding at least one of fibers selected from the group consisting of organic fibers and inorganic fibers selected from the group consisting of polyester fibers, polypropylene fibers, polyamide fibers, vinylon fibers, alamide fibers, cellulose fibers, carbon fibers, glass fibers, and rock wool.

21. The method of claim 20, wherein the mean particle size of the aggregate is about 2 to about 12 milimeters, the mean particle size of the at least one of RBC particles selected from the group consisting of RBC and CRBC particles is about 100 μm about 2.0 millimeters, and the average length of the at least one of fibers selected from the group consisting of organic fibers and inorganic fibers is about 0.5 millimeters to about 6 millimeters.

22. The method of claim 20, wherein the average diameter of the organic fibers is about 5 to about 15 μm, and the average diameter of the inorganic fibers is about 1 μm to about 5 μm.

23. The method of claim 19, wherein the aggregate constitutes about 90 to about 96 weight percent of the road paving material, the asphalt constitutes about 3.7 to about 7 weight percent, and the at least one of RBC particles selected from the group consisting of RBC particles and CRBC particles constitute about 0.3 to about 3 weight percent.

24. The method of claim 18, wherein about 1 to about 20 weight percent of the aggregate includes at least one of an RBC aggregate and CRBC aggregate.

25. The method of claim 18, wherein at least part of the aggregate includes at least one a product selected from the group consisting of:

a) a molded product selected from the group consisting of molded RBC, molded CRBC and mixtures thereof; and b) a crushed product selected from the group consisting of crushed RBC, crushed CRBC, and mixtures thereof.

26. The method of claim 25, wherein about 1 to about 20 weight percent of the aggregate includes at least one of the product selected from the group consisting of the molded product and the crushed product.

27. A method for improving the sound absorption and water permeability of paved surfaces, comprising the step of:

paving the surface with a paving material including aggregate, asphalt, and at least one particles selected from the group consisting of fine RBC particles and fine CRBC particles.

28. A method for improving the sound absorption and water permeability of a surface, comprising the step of:

paving the surface with a paving material including aggregate, asphalt, and at least one particle selected from the group consisting of fine RBC particles and fine CRBC particles.

* * * * *